(12) United States Patent
Flierl et al.

(10) Patent No.: US 11,111,389 B2
(45) Date of Patent: Sep. 7, 2021

(54) COMPOSITE PARTICLES HAVING HYDROPHILIC AND HYDROPHOBIC SURFACE COATINGS

(71) Applicant: Gebrüder Dorfner GmbH & Co. Kaolin- und Kristallquarzsand-Werke KG, Hirschau (DE)

(72) Inventors: Michael Flierl, Hirschau (DE); Marco Süß, Bodenwöhr (DE); Reinhard Kräuter, Sulzbach-Rosenberg (DE)

(73) Assignee: GEBRÜDER DORFNER GMBH & CO. KAOLIN- UND KRISTALLQUARZSAND-WERKE KG, Hirschau (DE)

( * ) Notice: Subject to any disclaimer, the term of this patent is extended or adjusted under 35 U.S.C. 154(b) by 75 days.

(21) Appl. No.: 15/990,113

(22) Filed: May 25, 2018

(65) Prior Publication Data

US 2018/0340073 A1 Nov. 29, 2018

(30) Foreign Application Priority Data

May 26, 2017 (DE) ...................... 10 2017 111 515.3

(51) Int. Cl.
*C09C 1/30* (2006.01)
*C08K 9/02* (2006.01)
(Continued)

(52) U.S. Cl.
CPC ............. *C09C 1/3054* (2013.01); *C08K 3/36* (2013.01); *C08K 3/40* (2013.01); *C08K 9/02* (2013.01);
(Continued)

(58) Field of Classification Search
None
See application file for complete search history.

(56) References Cited

U.S. PATENT DOCUMENTS 4,316,744 A   2/1982  Bergna
4,412,018 A * 10/1983  Finlayson ............... C01B 33/44
                                                                523/508
(Continued)

FOREIGN PATENT DOCUMENTS

DE   102014004914 A1   2/2015
EP        1820582 A1    8/2007
EP       2 937 160 A1  10/2015

OTHER PUBLICATIONS

102014004914 DE filed Feb. 26, 2015 (English machine translation of Abstract only).

(Continued)

*Primary Examiner* — Ronak C Patel
(74) *Attorney, Agent, or Firm* — Dickinson Wright PLLC; Nicholas P. Coleman

(57) ABSTRACT

The invention relates to composite particles, comprising a carrier particle and an at least partial surface coating, the carrier particle comprising a quartz and a layered silicate and the surface of the composite particle having at least one hydrophilic region and at least one hydrophobic region. The invention also relates to a method for producing composite particles, comprising the steps:
a) providing carrier particles, comprising a quartz and a layered silicate,
b) introducing the carrier particles into a mixing device,
c) charging the carrier particles with a coating composition,
d) coating the carrier particles with the coating composition by mixing the carrier particles with the coating composition, with the introduction of shear energy,
e) subjecting the coated carrier particles to temperature.
In addition, the invention relates to a mineral cast part or to a composite workpiece which comprises the above-described composite particles.

13 Claims, 1 Drawing Sheet

(51) Int. Cl.
*C08K 3/36* (2006.01)
*C08K 3/40* (2006.01)
*C09C 3/06* (2006.01)
*C09C 3/04* (2006.01)

(52) U.S. Cl.
CPC .............. *C09C 3/043* (2013.01); *C09C 3/063* (2013.01); *C01P 2002/60* (2013.01); *C01P 2004/84* (2013.01); *C08K 2201/005* (2013.01)

(56) References Cited

U.S. PATENT DOCUMENTS

| | | | | |
|---|---|---|---|---|
| 4,780,390 A | * | 10/1988 | Hosoi | G03G 9/09342 428/402.2 |
| 7,759,039 B2 | * | 7/2010 | Veregin | G03G 9/0804 430/110.2 |
| 2006/0154162 A1 | * | 7/2006 | Zhou | G03G 9/0804 430/108.1 |
| 2008/0261007 A1 | * | 10/2008 | Hong | E04D 7/005 428/216 |
| 2011/0259571 A1 | * | 10/2011 | Yamasaki | C09D 5/14 165/185 |
| 2014/0183104 A1 | | 7/2014 | Rothman et al. | |
| 2015/0370191 A1 | * | 12/2015 | Kabai | G03G 15/6585 399/228 |
| 2016/0378007 A1 | * | 12/2016 | Hori | G03G 9/09371 430/110.2 |
| 2019/0106886 A1 | * | 4/2019 | Caval | C04B 28/04 |

OTHER PUBLICATIONS

EPO Search Report dated Jul. 20, 2018 for EP 18 17 1302 based on priority application DE 10 2017 111 515.3
EP 1820582 A1(English machine translation).
10 2017 111 515.3 DE filed May 26, 2017 (English machine translation of Abstract only).

* cited by examiner

COMPOSITE PARTICLES HAVING HYDROPHILIC AND HYDROPHOBIC SURFACE COATINGS

This application claims priority to German Patent Application No. 10 2017 111 515.3, filed May 26, 2017, the disclosure of which is incorporated herein by reference.

TECHNICAL FIELD

The present invention relates to composite particles comprising a carrier particle and an at least partial surface coating. The invention also relates to a method for producing composite particles. In addition, the invention relates to mineral cast parts or to composite workpieces which contain composite particles of this type.

BACKGROUND OF THE INVENTION

Composite particles are known from the prior art. Composite particles are usually composed of a carrier particle and a surface coating. The surface coating can provide the composite particle with a desired characteristic. Due to the carrier particle which is usually relatively inexpensive, particles can thus be provided which provide a desired material characteristic at a relatively low cost. For example, as a result of using appropriate surface coatings, the carrier particles can be specifically provided with desired magnetic or optical characteristics. It is also possible to provide the particles with other desired material characteristics, for example with a high degree of hardness or with a high stability. Chemical characteristics, temperature resistance, abrasion resistance, colour, particle size or other characteristics can also be adjusted depending on the surface coating. Particles of this type are used in many areas due to the numerous possibilities of adjusting the characteristics of the composite particles. Chemical, metallurgical, pharmaceutical and optical uses are only mentioned here by way of example. Uses in composite materials and/or dyes are of particular interest.

However, the use of composite particles known so far is limited. In particular, if the intention is to embed the composite particles in a matrix, a person skilled in the art is restricted in his choice of surface coating, because in addition to ensuring the desired characteristics, he also has to ensure adequate dispersibility in the synthetic resin matrix.

Furthermore, during the effect of high shear forces, at least the surface of many composite particles is damaged, so that, for example, pigment particles become detached and the colour no longer corresponds to the desired colour shade following the exposure of the particles to the shear forces.

It is therefore the object of the present invention to provide a composite particle which has, even after the effect of high shear forces, a desired optical effect and at the same time can also be easily dispersed in a resin matrix.

A further object of the invention is to provide a method for producing composite particles which do not exhibit the above-mentioned disadvantages.

A further object of the present invention is to provide a mineral cast part or composite material in which composite particles are distributed homogeneously.

It has surprisingly been found that these objects can be achieved by a composite particle according to claim 1, by a method for producing composite particles according to claim 8 and by a mineral cast part or composite workpiece according to claim 10.

SUMMARY OF THE INVENTION

An essential aspect of the present invention is a composite particle, comprising a carrier particle and an at least partial surface coating. A carrier particle of this type is distinguished in particular in that it comprises a quartz and a layered silicate and the surface of the composite particle has at least one hydrophilic region and at least one hydrophobic region. In particular, the simultaneous presence of a hydrophilic region and of a hydrophobic region on the surface of a composite particle of this type has proved to be advantageous in respect of dispersibility in a synthetic resin matrix.

Layered silicate which is arranged on the surface preferably forms the hydrophobic surface regions of the carrier particle, while quartz preferably forms hydrophilic surface regions of the carrier particle. Due to these different surface characteristics, it is possible to coat different regions of the surface of the carrier particle in a different manner. For example, metals can be deposited in a targeted manner onto hydrophobic surface regions, so that incident light can be fully reflected in these regions. For the targeted coating of the hydrophobic surface regions, it may be necessary to previously mask hydrophilic surface regions.

Furthermore, in a preferred embodiment, it is possible to selectively colour different surface regions of the composite particle. For example, pigments can be added to a coating composition which selectively wets hydrophilic surface regions of the carrier particle and then cures or can be bonded onto said carrier particle. These pigments ensure that the surface is coloured only in the regions (which are hydrophilic in this case). In principle, differences other than the above-mentioned differences in reflection behaviour and colour would also be conceivable in the surface coatings of the different surface regions of the carrier particle.

A connected surface region of a composite particle is preferably understood as a hydrophilic or hydrophobic region. More preferably, each of these connected regions comprises at least 5%, preferably 10%, more preferably 20% of the surface of the composite particle. As a result of these relatively large connected regions with the respective characteristic, it can be ensured that this characteristic is also present in the composite material. For example, in a synthetic resin matrix, due to these relatively large regions, it can be ensured that on the one hand the dispersibility is reliably provided, while on the other hand an adequately large boundary layer is also formed which has only minimum interactions between the surface of the composite particle and the matrix, as a result of which particular optical characteristics are present in this region due to the light reflection at the boundary surface.

The carrier particles are preferably a natural raw material. It is particularly preferred if quartz and layered silicate are grown together at least locally. With carrier materials of this type which have been grown together, it has been found that it is particularly easy to realise the formation of local hydrophilic and hydrophobic regions on the surface of said carrier materials.

In a particularly preferred embodiment, the composite particles are distinguished in that the hydrophilic surface coating comprises a soluble glass or the secondary product thereof. A soluble glass is preferably an alkali soluble glass. More preferably, it is a sodium or potassium soluble glass as they are particularly cost-effective. It has been found that a local coating with soluble glass not only results in the provision of hydrophilic surface regions, but it also ensures that a composite particle of this type can withstand high shear forces.

In a preferred embodiment, the layered silicate has a composition of the type:

$$Dod_n Hex_{2-3}[Tet_4 O_{10}]X_2 \cdot mH_2O$$

where "Dod" are 12-times coordinated cations, "Hex" are 6-times coordinated cations, "Tet" are 4-times coordinated cations, "X" are anions, "n" is within a range of from 0.35 to 1 and "m" is within a range of from 0 to 24.

"Dod" are preferably cations selected from a group comprising $K^+$, $Na^+$ and $Ca^{2+}$. In a particularly preferred embodiment, "Dod" is $K^+$.

"n" is within a range of from 0.35 to 1. The product of "n" times the charge of "Dod" is preferably within a range of from 0.7 to 1. Particularly preferably, the product of "n" times the charge of "Dod" is approximately equal to 1, more preferably it is exactly equal to 1.

"Hex" are preferably cations selected from a group comprising $Li^+$, $Mg^{2+}$, $Fe^{i+}$ (more preferably as $Fe^{2+}$), $Mn^{2+}$ and $Al^{3+}$. In a particularly preferred embodiment, "Hex" is selected from a group comprising $Mg^{2+}$, $Fe^{2+}$ and $Al^{3+}$.

"Tet" are preferably cations selected from a group comprising $Si^{4+}$, $Fe^{i+}$ (more preferably as $Fe^{3+}$) and $Al^{3+}$. In a particularly preferred embodiment, "Tet" is $Si^{4+}$ and/or $Al^{3+}$.

"X" are preferably anions selected from a group comprising $OH^-$, $Cl^-$ and $F^-$. In a particularly preferred embodiment, "X" is $F^-$ or $OH^-$.

In most cases, the presence of water of crystallisation is not critical to the suitability of a layered silicate for the present invention, so that "m" can be varied over a wide range. However, it has been found that it is preferable if "m" assumes relatively low values, since during a thermal treatment, less water of crystallisation issues and the layered structure is disturbed to a lesser extent. Therefore, in a preferred embodiment, "m" is within a range of from 0-12, in a further preferred embodiment it is ≤8, and particularly preferably ≤4. Layered silicates which do not contain any water of crystallisation have proved to be particularly suitable. Therefore, "m" is particularly preferably equal to 0.

In a further preferred embodiment, the composite particle is distinguished in that it has a grain size ($D_{50}$, measured using silicate) of between 10 and 1,000 μm, preferably between 25 and 500 μm, particularly preferably between 50 and 200 μm. It has been found that these grain sizes are particularly suitable in order to be introduced into the composite materials or mineral cast parts in a uniformly distributed manner and also to exhibit the desired optical effects.

In a preferred embodiment, the hydrophilic surface coating is in a mass percentage of less than 10%, preferably less than 8% and particularly preferably between 0.1 and 5%, based on the total mass of the composite particle. These percentages have proved to be high enough to ensure the desired characteristics in respect of shear resistance, stability and dispersibility of the composite particles. On the other hand, these percentages are within a range which can be easily applied using known technologies and which is also economically feasible in respect of the relatively high costs of this surface coating. If percentages are not defined otherwise in the following, they are to be respectively understood as a mass percentage based on the total mass of the composite particle. As stated above, the hydrophilic binder coating and/or soluble glass coating are preferably present on the hydrophilic regions of the carrier particle.

In a preferred embodiment, the surface coating comprises a pigment. This pigment can be embedded in the surface coating, for example. Pigments can be embedded relatively easily into a surface coating in particular when soluble glass is used as the surface coating. A pigment can produce a particular colour effect of the composite particle. Since pigments are generally relatively expensive, the mass percentage is preferably less than 5%, more preferably less than 4% and particularly preferably within a range of between 0.01 and 3%, based on the total mass of the composite particle.

These mass percentages ensure outstanding colour characteristics at a relatively low cost.

A further essential aspect of the present invention is a method for producing composite particles. This method according to the invention comprises the following steps:
a) providing the carrier particles,
b) introducing the carrier particles into a mixing device,
c) charging the carrier particles with a coating composition,
d) coating the carrier particles with the coating composition by mixing the carrier particles with the coating composition, with the introduction of shear energy,
e) subjecting the coated carrier particles to temperature.

This method allows the composite particles to be produced in a particularly simple and efficient manner.

In a preferred variant of the method, the carrier particles are provided in a selected grain size. In a particularly preferred variant of the method, the grain size is within a range of between 10 and 1,000 μm ($D_{50}$, measured using silicate). More preferably, the grain size is between 25 and 500 μm, more preferably between 50 and 200 μm.

The mixing device is preferably a compulsory mixer. Mixing devices which can attain a high input of shear energy are particularly preferred. The thickness of the coating can be controlled by the input of shear energy in addition to the proportion of the coating composition. In a preferred variant of the method, the input of shear energy is selected depending on the amount of coating compositing which is used, such that the surface coating is in a thickness of several 1 μm.

In a preferred variant of the method, due to the composition of the carrier particles of a quartz and a layered silicate, a varying wetting with the coating composition results on account of the different carrier material characteristics, subject to the local composition. This can ensure that the surface coating has at least one hydrophilic region as well as one hydrophobic region.

In step e), the coated carrier particles are subjected to temperature. This temperature exposure step preferably takes place at a temperature of between 200 and 1,200° C., preferably between 300 and 900° C., more preferably between 400 and 800° C. and particularly preferably between 450 and 700° C. At these temperatures, the layered silicate is reacted, for example in the form of a partial or complete calcination.

During this reaction of the layered silicate, stacks are formed which cause, inter alia, a high light reflection and thus a high brilliance and luminosity due to their layered structure.

The light can be completely reflected depending on the incidence angle of the light which falls onto the hydrophobic regions (for example onto the above-mentioned stacks). Of particular significance to the complete reflection over the greatest possible angular region is the reflection behaviour of the hydrophobic material and/or the difference of the refractive index at the transition between the medium surrounding the particle (for example air or a synthetic resin matrix) and the hydrophobic material (for example the respective stack). For example, if the hydrophobic material is a silver coating, total reflection can occur at the silver surface, so that the effect particle coated thus appears as a bright, shiny point (for example in a synthetic resin matrix).

In a preferred variant of the method, the temperature exposure step is followed by a further exposure to shear force, during which superficially arranged stacks can become detached and a surface coating which possibly adheres thereto, such as soluble glass, is removed from the composite particle. If necessary and if it is impossible to ensure an adequate differentiation between surface-coated and non-surface-coated regions or between hydrophilic and hydrophobic surface regions, the desired high reflection, brilliance and luminosity of the composite particle can be achieved by this local removal of stacks in these regions.

A clearly silvery gleaming metallic effect is produced in these areas particularly in a synthetic resin matrix. A composite particle of this type can thus be used in a synthetic resin matrix as an effect particle. The surface which has both hydrophilic and hydrophobic regions allows a good dispersibility in a synthetic resin matrix. This can prevent the effect particles from floating in the synthetic resin matrix and can ensure a uniform distribution in the synthetic resin up until it cures, and as a consequence thereof, thus also in the cured state. The hydrophilic quartz portion can be coated with inorganic pigments, for example, as described above. Due to the clearly differentiated surface regions, a composite particle of this type has a clear sparkling effect, without resulting in colour shifts or greying of the background.

In a preferred embodiment, the pigments of the surface coating are adapted to the matrix in terms of colour. This can prevent a discoloration of the surface of the synthetic resin. In this case, only the metallic effect of the reflecting regions (stacks) can be detected.

In a preferred embodiment, only the hydrophilic region (for example the quartz) coalesces with the surface coating (for example sodium soluble glass) and with a pigment.

Composite particles according to the present invention are preferably used as filling material in mineral cast parts or composite workpieces.

A further essential aspect of the present invention is therefore a mineral cast part or composite workpiece which comprises composite particles according to the present invention. For this purpose, in a preferred embodiment, composite particles according to the present invention are admixed with mixtures of colour ribbons which are then used to produce a mineral cast part or a composite workpiece.

In this respect, the high shear resistance of the composite particles according to the invention has proved to be particularly advantageous. These composite particles are not destroyed even when subjected to a high shear force. This essentially distinguishes the composite particles according to the invention from conventional effect pigments which are destroyed under a high shear force, so that even non-pigment-coated regions emerge and result in a colour shift or in greying of the background. When subjected to a shear force, conventional effect pigments can also be completely worn down, so that they can no longer be visually detected.

To produce mineral cast parts or composite workpieces, the colour ribbon mixtures which, according to the invention, comprise composite particles, are mixed with liquid polyester, acrylic or epoxy resins, for example. In a preferred embodiment, this procedure is carried out in stirrer vessels, with mixing screws. In this respect, the speed of the mixing screws can be up to 1,000 revolutions per minute. In contrast to conventional pigments which are destroyed at such high speeds and with the correspondingly high input of shear energy, the composite particles according to the invention remain intact and are distributed extremely homogeneously in the matrix.

The composite workpiece is preferably a kitchen sink, a shower tray, a wash basin or a bath tub. As mentioned above, a composite particle can also be added to purely mineral compositions. In addition to the above-mentioned mineral cast parts, the composite particles according to the invention can also be used as effect pigments in floors, floor coverings, renders, wall paints, worktops and the like. It is possible for the composite particles according to the present invention to be used in the mentioned applications as optical components or as effect particles. In these applications, they invoke an obvious sparkling effect. Due to the good dispersibility, an effect pigment based on a composite particle according to the present invention remains permanently uniformly distributed during the production of the above-mentioned composite workpieces, mineral cast parts, paints or lacquers. Particularly in the case of mineral cast parts or composite workpieces, the composite particles according to the invention do not float on the rear side of the workpiece before it cures.

Since the starting materials are relatively cost-effective, it is possible to use the composite particles according to the invention in a very high proportion as filler in mineral cast parts or in composite workpieces. Due to a high proportion of the composite particles, the proportion of expensive binders, such as resin, can be reduced. However, it is also conceivable to use composite particles according to the present invention merely as an additive in other fillers. Because of these various possibilities of use and quantity ranges, in principle it is conceivable to use the composite particles according to the invention in quantity ranges of from 0.1 to 99 mass percent, based on the total weight of a mineral cast part or a composite workpiece. Particularly when high filler degrees are required, it is, however, advantageous if further fillers are used. In a particularly preferred embodiment, a mineral cast part or composite workpiece therefore has a mass percentage of the composite particles according to the invention within a range of from 1 to 50%, preferably from 2 to 40%.

Further advantages, objectives and characteristics of the present invention are explained in the following description of accompanying drawings which show an exemplary embodiment of the present invention. Components in the drawings which are at least substantially the same in respect of their function can be identified by the same reference numerals, whereby it is not necessary to identify and describe these components in every case.

DETAILED DESCRIPTION OF THE INVENTION

Figure 1:
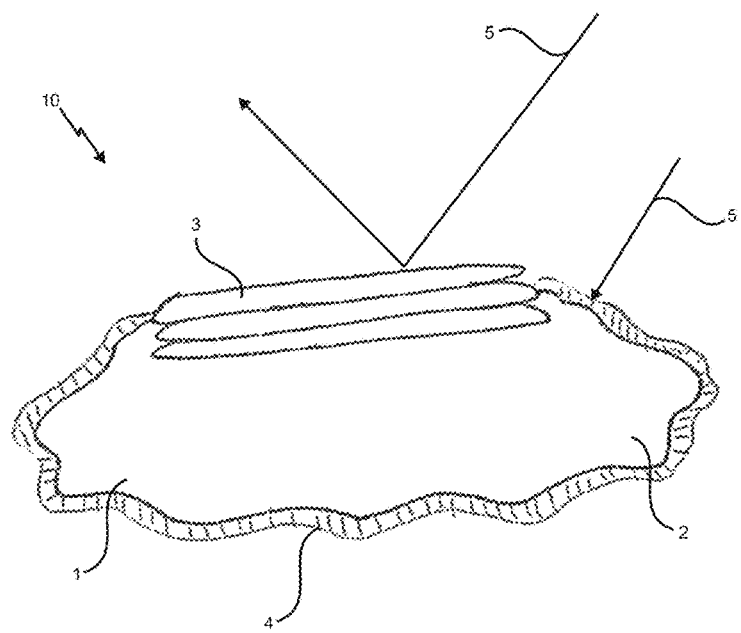
FIG. 1 schematically shows a first embodiment of a composite particle having hydrophilic and hydrophobic surface regions and the interaction thereof with incident light.

FIG. 1 shows a first embodiment of a composite particle 10. The drawing shows the carrier particle 1 which has two regions which are separate from one another. Region 2 which is larger in the example shown consists of quartz and is hydrophilic. Region 3 which is smaller in the example shown consists of a layered silicate. This layered silicate has relatively hydrophobic characteristics. When coated with a hydrophilic surface coating 4, this coating is deposited on the hydrophilic surface regions of the quartz 2. The surface coating 4 can also contain pigments which are not shown.

Due to the different surface characteristics, the hydrophilic and hydrophobic surface regions differ in respect of their scatter and reflection behaviour for light. Whereas the relatively hydrophobic layered silicate 3 reflects light almost completely, in particular after a thermal treatment, for example a calcination, due to the formation of stacks, the surface coating 4, for example soluble glass, arranged on the hydrophilic regions 2 scatters incident light in a diffuse manner.

With the presence of pigments in this surface coating 4, particular wavelengths are absorbed from the incident light, so that the scattered light has a defined colour. Due to the diffusely scattered and partly absorbed light, the regions of the composite particles on which the surface coating 4 is arranged, appear darker than the regions in which the relatively hydrophobic layered silicate 3 is arranged on the surface. In these regions, the incident light is completely reflected, subject to the position of the individual stacks, so that in the corresponding position of the composite particle relative to the light source and to an observer's eye, a complete reflection occurs and these regions appear particularly bright. Since this effect also occurs in a binder matrix, such as in a synthetic resin matrix, these regions appear as particularly bright or even glittering areas in the composite material. Glitter effects of this type can also be achieved in lacquers or wall paints.

Figure 2:
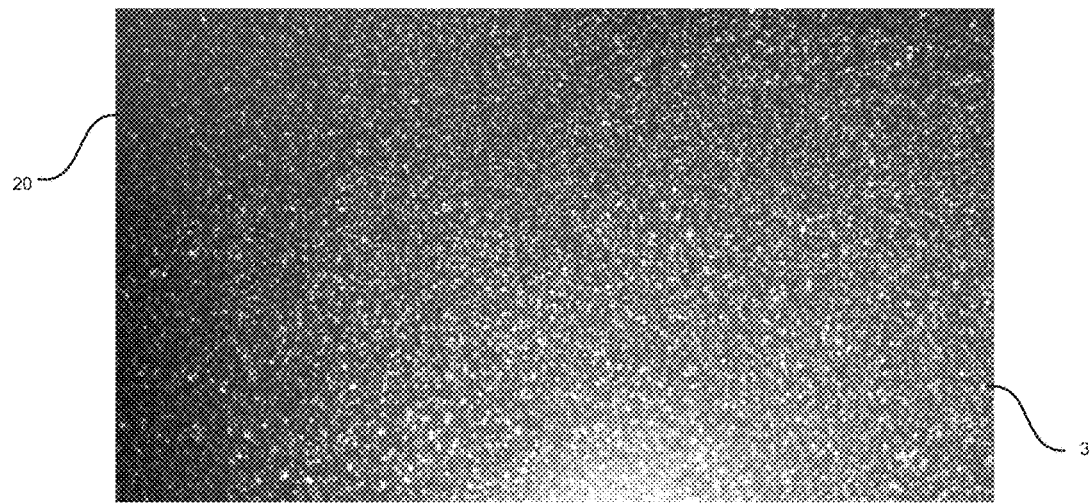
FIG. 2 shows a composite material which contains composite particles according to the present invention.

FIG. 2 shows a composite material 20 which contains composite particles (not detectable in their entirety) according to the present invention. The resin matrix of the composite material 20 is dyed black. Against this black background, the composite particles embedded therein can be clearly seen as light dots. The composite particles completely reflect incident light on particular surface regions 3 (namely on the hydrophobic regions of the carrier particle) due to the coating arranged thereon. Subject to the size of these surface regions 3 of the composite particles, to the depth of the respective composite particle in the composite material 20 and to the incidence angle of the incident light (significantly influenced in this case by the flash of the camera), the reflexes occurring in the composite material 20 appear in a varying brightness.

EXAMPLE

Mixtures based on coloured quartz are provided for the production of a composite material, as shown by way of example in FIG. 2, which can be used to produce kitchen sinks, for example. Due to the high shear resistance of the composite particle, on the one hand the high shear energies of the compulsory mixer can be withstood, and on the other hand the coated particles are not suctioned away by the dust extraction units due to the reinforcing coating and to the greater weight resulting therefrom. The faultless processibility means that the customer can be provided with complete mixtures. These mixtures can be specifically processed in a casting machine, without being destroyed in the mixing screw.

To produce a composite particle of this type, the raw material is introduced into a compulsory mixer. In a dry state, 1 mass % of a silver-coloured pigment is added and this is mixed into the raw material for one minute. Thereafter, 3 mass % of a sodium soluble glass are added and again mixed for at least 3 minutes. In doing so, the hydrophilic binder together with the pigment is preferably laid on the hydrophilic surface parts. This moist raw material is then transferred into a rotary kiln and partly calcined with a minimum residence time of 20 minutes.

To produce a composite material of this type, black coloured quartz of various grain sizes is mixed with 10 mass % of a partially silver coated composite particle. This mixture is cast in a casting machine with a synthetic resin proportion of 30 mass % and then cured. The filler composition for such a composite material comprises:
90 mass % of black coloured quartz of a grain size of 0.1-0.3 mm and
10 mass % of silver composite particle.

These materials are mixed with a resin matrix, thus resulting in a composition of the non-cured raw mass as follows:
70 mass % of the above-described quartz mixture (1)
30 mass % of unsaturated polyester resin
2.0 mass % of hardener Following intensive mixing with the introduction of high shear forces and after casting, a composite material surface can be obtained, as shown in FIG. 2.

The Applicant reserves the right to claim all features, disclosed in the application documents, as being essential to the invention, provided that, on their own or combined, they are novel over the prior art. It is also pointed out that features which can be advantageous in their own right are also described in the individual drawings. The person skilled in the art will immediately see that a particular feature which is described in a drawing can also be advantageous without adopting further features from this drawing. Furthermore, the person skilled in the art will understand that advantages can also be provided by a combination of several features which are shown in individual drawings or in different drawings.

LIST OF REFERENCE NUMERALS

1 carrier particle
2 relatively large region consisting of quartz
3 relatively small region consisting of layered silicate
4 hydrophilic surface coating
10 composite particle
20 composite material

The invention claimed is:

1. A composite particle, comprising a carrier particle and an at least partial surface coating covering at least part of the carrier particle,
   characterised in that the carrier particle comprises a hydrophilic surface region comprising quartz and wherein the carrier particle further comprises a hydrophobic surface region comprising a layered silicate, and wherein the surface of the composite particle has at least one hydrophilic region and at least one hydrophobic region wherein quartz and layered silicate are present, grown together, to form the carrier particle.

2. The composite particle according to claim 1, characterised in that the surface coating is a hydrophilic surface coating which comprises a soluble glass.

3. The composite particle according to claim 1, characterised in that the layered silicate has a composition of the type

where "Dod" are 12-times coordinated cations, "Hex" are 6-times coordinated cations, "Tet" are 4-times coordinated cations and "X" are anions, "n" is within a range of from 0.35 to 1 and "m" is within a range of from 0 to 24.

4. The composite particle according to claim 1, characterised in that it has a grain size ($D_{50}$, sedigraph) of between 10 and 1000 µm.

5. The composite particle according to claim 1, characterised in that the surface coating is a hydrophilic surface coating which is present in a mass percentage of less than 10%, based on the total mass of the composite particle.

6. The composite particle according to claim 1, characterised in that the surface coating comprises a pigment which is present in a mass percentage of less than 5%, based on the total mass of the composite particle.

7. The composite particle according to claim 1, characterised in that it has a grain size (D50, sedigraph) of between 25 and 500 µm.

8. The composite particle according to claim 1, characterised in that it has a grain size (D50, sedigraph) of between 50 and 200 µm.

9. The composite particle according to claim 1, characterised in that the surface coating is a hydrophilic surface coating which is present in a mass percentage of less than 8%, based on the total mass of the composite particle.

10. The composite particle according to claim 1, characterised in that the surface coating is a hydrophilic surface coating which is present in a mass percentage of 0.1-5%, based on the total mass of the composite particle.

11. The composite particle according to claim 1, characterised in that the surface coating comprises a pigment which is present in a mass percentage of less than 4%, based on the total mass of the composite particle.

12. The composite particle according to claim 1, characterised in that the surface coating comprises a pigment which is present in a mass percentage of 0.01-3%, based on the total mass of the composite particle.

13. A mineral cast part or composite workpiece, characterised in that it comprises composite particles according to claim 1.

* * * * *